(12) United States Patent
Weissman (10) Patent No.: US 7,062,252 B2
(45) Date of Patent: Jun. 13, 2006

(54) CAPACITY OPTIMIZATION OF A WIRED CELLULAR NETWORK

(75) Inventor: Haim Weissman, Haifa (IL)

(73) Assignee: Qualcomm, Incorporated, San Diego, CA (US)

( * ) Notice: Subject to any disclaimer, the term of this patent is extended or adjusted under 35 U.S.C. 154(b) by 173 days.

(21) Appl. No.: 10/689,818

(22) Filed: Oct. 20, 2003

(65) Prior Publication Data

US 2004/0203560 A1 Oct. 14, 2004

Related U.S. Application Data

(60) Provisional application No. 60/463,277, filed on Apr. 14, 2003.

(51) Int. Cl.
*H04Q 7/20* (2006.01)
*H04Q 7/00* (2006.01)
*H04B 15/00* (2006.01)
*H04B 7/14* (2006.01)
*G01R 31/08* (2006.01)

(52) U.S. Cl. .................. 455/403; 455/16; 455/506; 370/225; 370/334

(58) Field of Classification Search ................ 455/403, 455/445, 3.06, 561, 67.1, 509, 16, 506, 67.14; 370/225, 334, 522; 725/111, 102, 119
See application file for complete search history.

(56) References Cited

U.S. PATENT DOCUMENTS

| 4,704,733 | A | * | 11/1987 | Kawano | 455/16 |
| 5,592,471 | A | * | 1/1997 | Briskman | 455/506 |
| 5,642,155 | A | * | 6/1997 | Cheng | 725/119 |
| 5,754,555 | A | * | 5/1998 | Hurme et al. | 370/522 |
| 5,828,946 | A | * | 10/1998 | Feisullin et al. | 725/106 |
| 5,839,052 | A | * | 11/1998 | Dean et al. | 725/106 |
| 5,867,763 | A | * | 2/1999 | Dean et al. | 725/114 |
| 5,909,471 | A | | 6/1999 | Yun | 375/343 |
| 5,926,755 | A | * | 7/1999 | Ghisler | 455/509 |
| 6,307,851 | B1 | * | 10/2001 | Jung et al. | 370/342 |
| 6,339,611 | B1 | | 1/2002 | Antonio et al. | 375/130 |
| 6,567,660 | B1 | * | 5/2003 | Wegener | 455/418 |
| 6,618,353 | B1 | * | 9/2003 | Merrill et al. | 370/225 |
| 6,766,527 | B1 | * | 7/2004 | Tsutsui et al. | 725/102 |
| 6,865,390 | B1 | * | 3/2005 | Goss et al. | 455/445 |
| 2001/0005907 | A1 | * | 6/2001 | Pekonen | 725/111 |

(Continued)

FOREIGN PATENT DOCUMENTS

EP 1168788 1/2002

(Continued)

*Primary Examiner*—William Trost
*Assistant Examiner*—Kiet Doan
(74) *Attorney, Agent, or Firm*—Philip R. Wadsworth; Bruce W. Greenhaus; James D. McFarland (57) ABSTRACT

A base-station transceiver system (BTS) operative in a cellular telephone network, consisting of a main up-link port and a diversity up-link port which are adapted to operate cooperatively to receive up-link signals over-the-air from cellular telephones such that both of the ports receive the up-link signals from each of the cellular telephones. The two ports are coupled to receive signals from wired telephones, such that the main up-link port receives signals only from a first group of the wired telephones and the diversity up-link port receives signals only from a second group of the wired telephones. The system also includes signal processing circuitry which is adapted to receive the signals from the up-link ports and convey the signals over the network.

17 Claims, 3 Drawing Sheets

U.S. PATENT DOCUMENTS

| | | | |
|---|---|---|---|
| 2002/0158689 A1 | 10/2002 | Harris et al. | 330/129 |
| 2002/0191565 A1* | 12/2002 | Mani et al. | 370/334 |
| 2003/0064681 A1* | 4/2003 | Uedo | 455/3.06 |
| 2004/0203468 A1* | 10/2004 | Dent et al. | 455/67.14 |

FOREIGN PATENT DOCUMENTS

| | | |
|---|---|---|
| FR | 2693331 | 7/1992 |
| WO | 0233855 | 4/2002 |

* cited by examiner

CAPACITY OPTIMIZATION OF A WIRED CELLULAR NETWORK

CROSS REFERENCE TO RELATED APPLICATION

This application claims the benefit of U.S. Provisional Patent Application No. 60/463,277, filed on Apr. 14, 2003.

FIELD OF THE INVENTION

The present invention relates generally to communication systems, and specifically to wired and cellular telephone systems.

BACKGROUND OF THE INVENTION

There are a number of telephone systems that are very well known in the art. The oldest system, and probably still the most widely used, is a public switched telephone network (PSTN) where a simple telephone is physically coupled to a telephone network via conducting wires. An extension to the PSTN comprises a cordless telephone system, typically used in a home or an office, where a portable telephone communicates in an unwired manner with a console in the home. The console is wired to the PSTN in place of the simple telephone, and the communication between the console and the portable phone is generally via a radio-frequency (RF) carrier, although other methods such as using an infra-red carrier are also known in the art.

A cable television (CATV) system may also be used as another wired system for transferring standard circuit switch or Internet Protocol (IP) telephone signals. The CATV system is coupled at its up-link side to an IP network and to the PSTN. At the down-link side, e.g., in a home or office environment, a landline telephone may be coupled to the CATV system via a modem. The CATV system allocates up-link and down-link channels which do not interfere with television signals in the CATV system.

Cellular telephone systems use wireless mobile cellular telephones which communicate with a central base-station. Communication between the mobile telephones and the base-station is via a cellular RF carrier, the cellular RF carrier being at a different frequency, and having substantially larger powers, than the RF carrier of the cordless telephone system described above.

A wired cellular system, wherein cellular telephones of a cellular telephone system are physically connected to cables of the CATV system, is described in U.S. patent application Ser. No. 10/360,861, which is assigned to the assignee of the present application. In such a wired cellular system it is important to have as high an operating capacity as possible, while still operating with a basic CATV architecture. Such an architecture typically has a small number of return path receivers for each forward transmit section.

SUMMARY OF THE INVENTION

It is an object of some aspects of the present invention to provide a method and apparatus that optimizes the capacity of a wired cellular communications system.

In preferred embodiments of the present invention, a wired cellular system comprises a cellular telephone network which is coupled to a cable television (CATV) network. Cellular telephone adapters, most preferably operative as wired telephones in the cellular telephone network, are connected by wires to the CATV network. Cellular communications are conveyed, via a cabling system of the CATV network, between the cellular telephone adapters and a head end of the cellular network which is upstream of the adapters. The head end of the cellular network preferably comprises one or more sectors of one or more base-station transceiver systems (BTSs), each sector receiving a main up-link RF cellular signal and a diversity up-link RF cellular signal via respective main and diversity ports. The cellular telephone adapters are divided into a plurality of groups, a first group transmitting upstream to the main port of a specific sector, a second group transmitting upstream to the diversity port of the sector.

Using the main and the diversity ports to receive separate upstream signals significantly increases the upstream capacity of each of the sectors, compared to systems using the main and diversity ports for common upstream signals. The capacity also increases compared to systems using a combined single transmitter and combined receive chains, as occurs in a typical indoor cellular system. Furthermore, the signal to interference ratio (SIR) at the BTS site is increased compared to a wired cellular system with no sub-division of adapters. Increased SIR leads to an increased overall capacity for the wired cellular system.

Signals are most preferably transferred between the cellular telephone adapters and their respective sectors by converting up-link and down-link RF signals to respective up-link and down-link intermediate frequency (IF) signals.

In some preferred embodiments of the present invention, an existing CATV architecture comprises an existing four-way splitter that directs a single CATV down-link transmission to four separate groups of CATV receivers. Each group receives its signals via a respective fiber node duplexing system which acts as a duplexer and a splitter. Up-link CATV signals are fed from the CATV receivers, via the duplexing systems, to four return path receivers (RPRs), one RPR for each group.

Down-link cellular transmissions from two BTS sectors are multiplexed and are fed, via the four-way splitter and the four fiber nodes, to the four groups of receivers. Two of the groups receive one sector's transmissions, the other two groups receive the other sector's transmissions. Up-link cellular signals from each of the groups are fed via the duplexing systems to the respective RPRs. Each RPR filters the up-link cellular signals from its up-link CATV signals, and the four sets of recovered up-link cellular signals are transferred to a main or a diversity port of one of the sectors. Thus, coupling two BTS sectors to the existing CATV architecture, so as to add a wired cellular system to the architecture, makes extremely efficient use of existing CATV elements.

Such a system supports approximately four times the capacity of a conventional single sector that drives four fiber nodes via a single transmit path and a single combined receive path for all four fiber nodes.

The present invention will be more fully understood from the following detailed description of the preferred embodiments thereof, taken together with the drawings, a brief description of which is given below.

DETAILED DESCRIPTION OF PREFERRED EMBODIMENTS

Figure 1:
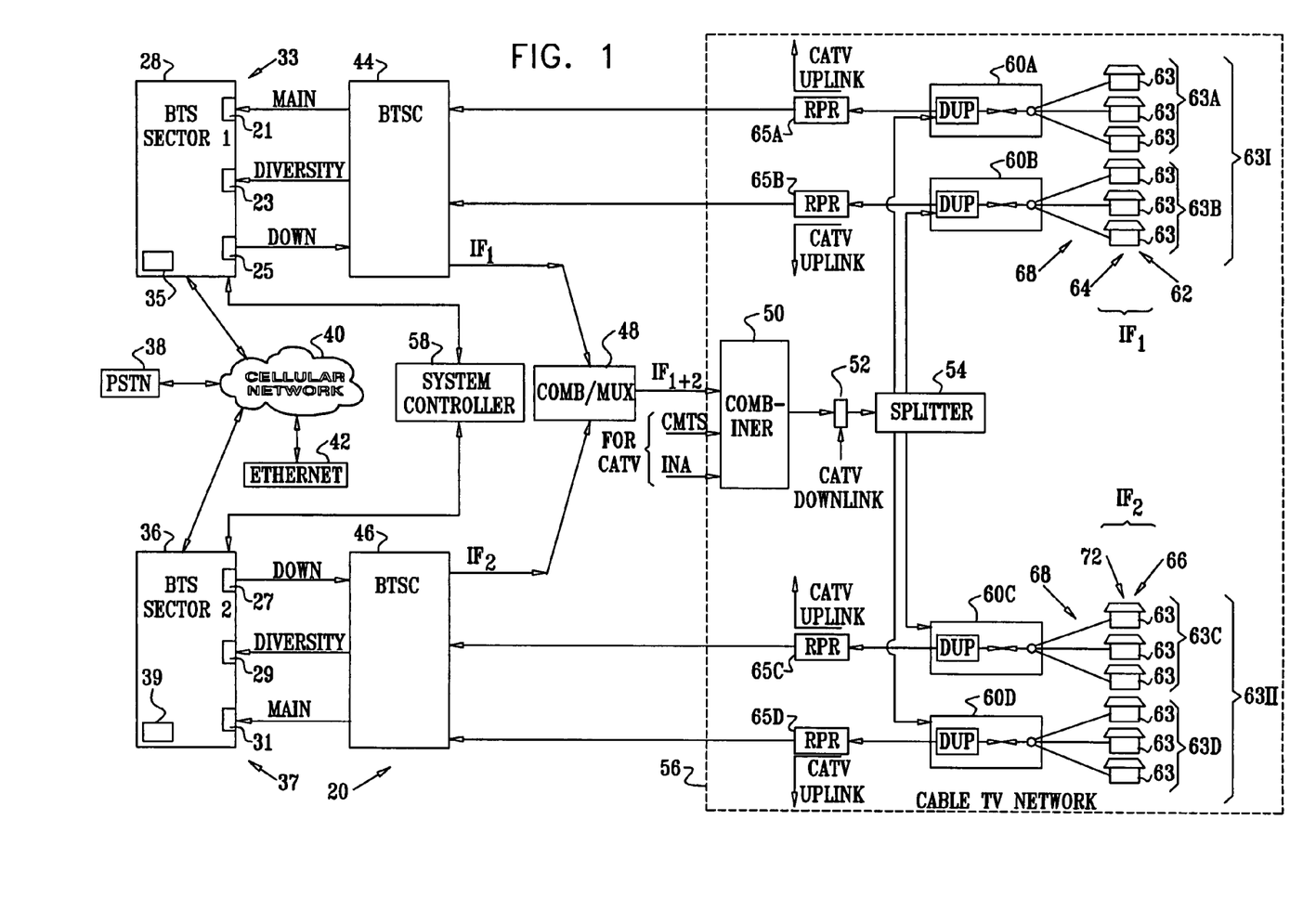
FIG. 1 is a schematic diagram illustrating a wired cellular system, according to a preferred embodiment of the present invention.

Reference is now made to FIG. 1, which is a schematic diagram illustrating a wired cellular system 20, according to a preferred embodiment of the present invention. At an upstream side of system 20, a first cellular network base-station transceiver system (BTS) sector 28 transmits cellular radio-frequency (RF) down-link signals from a down-link port 25, and is directly coupled to receive main and diversity cellular up-link RF signals at respective main and diversity up-link ports 21 and 23. Hereinbelow down-link and up-link signals are also referred to respectively as forward and reverse signals. A second cellular network BTS sector 36 also transmits cellular RF down-link signals from a down-link port 27, and is directly coupled to receive main and diversity cellular up-link RF signals at respective main and diversity up-link ports 31 and 29. BTS sectors 28 and 36 may be installed in the same BTS or in different BTSs. The up-link and down-link signals to and from sectors 28 and 36 are described in more detail below. BTS sectors 28 and 36 respectively comprise signal processing circuitry 35 and 39, which transfer upstream and downstream signals between the sectors and a cellular network 40 within which the sectors operate. Circuitries 35 and 39 also transfer signals between their sectors and other upstream elements coupled to cellular network 40, such as an Ethernet network 42 and a public switched telephone network (PSTN) 38, by any suitable means known in the art.

It will be appreciated that preferred embodiments of the present invention may be implemented for any cellular communication system, including a Code Division Multiple Access (CDMA) system, a Time Division Multiple Access (TDMA) system, a Frequency Division Multiple Access (FDMA), and/or combinations of these and other cellular communication systems known in the art.

Each sector is coupled to a BTS converter (BTSC) which converts cellular RF signals to cellular intermediate frequency (IF) signals, and vice versa. Thus, sector 28 is coupled to a BTSC 44, and the BTSC generates a forward IF signal $IF_1$ from a forward RF signal received from sector 28, and reverse RF main and diversity signals from IF reverse main and diversity signals, the latter being produced, as is explained in more detail below, downstream of BTSC 44. Similarly, sector 36 is coupled to a BTSC 46, which performs substantially similar functions to those of BTSC 44, and generates a forward IF signal $IF_2$, and reverse RF main and diversity signals from IF reverse main and diversity signals. Typically, $IF_1$ and $IF_2$ comprise frequencies which are less than their originating cellular RF signals. Optionally, $IF_1$ and $IF_2$ comprise frequencies which are greater than their originating cellular RF signals. The values of $IF_1$ and $IF_2$ are chosen so that they are different, and so that they do not interfere with cable television (CATV) signals transmitted in an existing CATV network 56, which CATV signals are described in more detail below.

The forward IF cellular signals from BTSCs 44 and 46 are multiplexed in a combiner 48, and the combined and multiplexed signal $IF_{1+2}$ is conveyed to a CATV head-end combiner 50, which is typically an existing combiner comprised in CATV network 56. Head-end combiner 50 also receives down-link CATV cable modem termination system (CMTS) Internet signals, and CATV interactive network adapter (INA) signals, and combines them with $IF_{1+2}$. A CATV multi-channel coupler 52 combines the signal from combiner 50 with CATV down-link broadcast TV channels to form a combined down-link signal, which is transferred to a four-way splitter 54 of network 56, the splitter typically already existing in CATV network 56. Splitter 54, as well as acting as a splitter, most preferably also converts the $IF_{1+2}$ signals (as well as the CATV signals) to optical signals.

Splitter 54 is connected to four generally similar duplexing systems 60A, 60B, 60C, and 60D, each system being typically configured from one or more duplexers and one or more splitters. Each duplexing system 60A, 60B, 60C, and 60D, acts as a coupler between splitter 54, respective groups 63A, 63B, 63C, and 63D of individual cable TV receiver facilities 63, and a respective return path receiver (RPR) 65A, 65B, 65C, and 65D. Systems 60A, 60B, 60C, and 60D carry up-link signals from facilities 63, and down-link signals to the facilities. Systems 60A, 60B, 60C, and 60D, and RPRs 65A, 65B, 65C, and 65D are also referred to generically hereinbelow as system 60 and RPR 65. Facilities 63 and RPR 65 are described in more detail below. Components comprised in duplexing systems 60 are known in the CATV art, and each system typically comprises a fiber node (coupled to splitter 54) which acts, inter alia, as an RF/optic signal converter, and a "Street Shelf" node coupled to the fiber node, which acts as a distributor of the RF signals to facilities 63.

Operations of sectors 28 and 36, converters 44 and 46, and combiner 48 are under the overall control of a system controller 58, which is preferably able, inter alia, to select values of $IF_1$ and $IF_2$, as is described in more detail below. Optionally, values of $IF_1$ and $IF_2$ may be selected in BSTC 44 and 46.

In an alternative preferred embodiment of the present invention, each BTS sector and BTSC combination is implemented as a "stripped-down" version of a standard BTS sector, using intermediate frequencies generated within the BTS sector. Most preferably, each stripped-down BTS sector comprises a respective cell site modem (CSM) 33, 37, which communicate directly with combiner 48 using IF signals generated in the modem, obviating the need for BTSC 44 and 46. Optionally, more than one CSM, preferably mounted on one board, may be used in each stripped-down BTS sector, if more than one IF carrier is used.

Individual cable TV receiver facilities 63 are coupled to CATV cabling network 56 at its downstream side. Facilities 63 are typically dwelling units, although any other facility to which network 56 may be coupled, such as an office, may act as a cable TV receiver facility. Each cable TV receiver facility 63 is coupled to CATV cabling network 56 by a wire 68. Groups 63A and 63B are implemented to operate as a first combined group, herein termed group 63I. Groups 63C and 63D are implemented to operate as a second combined group, herein termed group 63II. As explained in more detail below, facilities in group 63I are configured to receive $IF_1$ forward signals from BTSC 44, and facilities in group 63II are configured to receive $IF_2$ forward signals from BTSC 46.

At each facility 63, each wire 68 is terminated by a telephone adapter which, as is described in more detail below, may be coupled to act as a wired telephone. Each facility 63 in group 63I is assumed to comprise a telephone adapter 62, and each facility 63 in group 63II is assumed to comprise a telephone adapter 72. Adapters 62 and 72 are described below. Group 63I is assumed to comprise a home 64, and group 63II is assumed to comprise a home 66.

Figure 2:
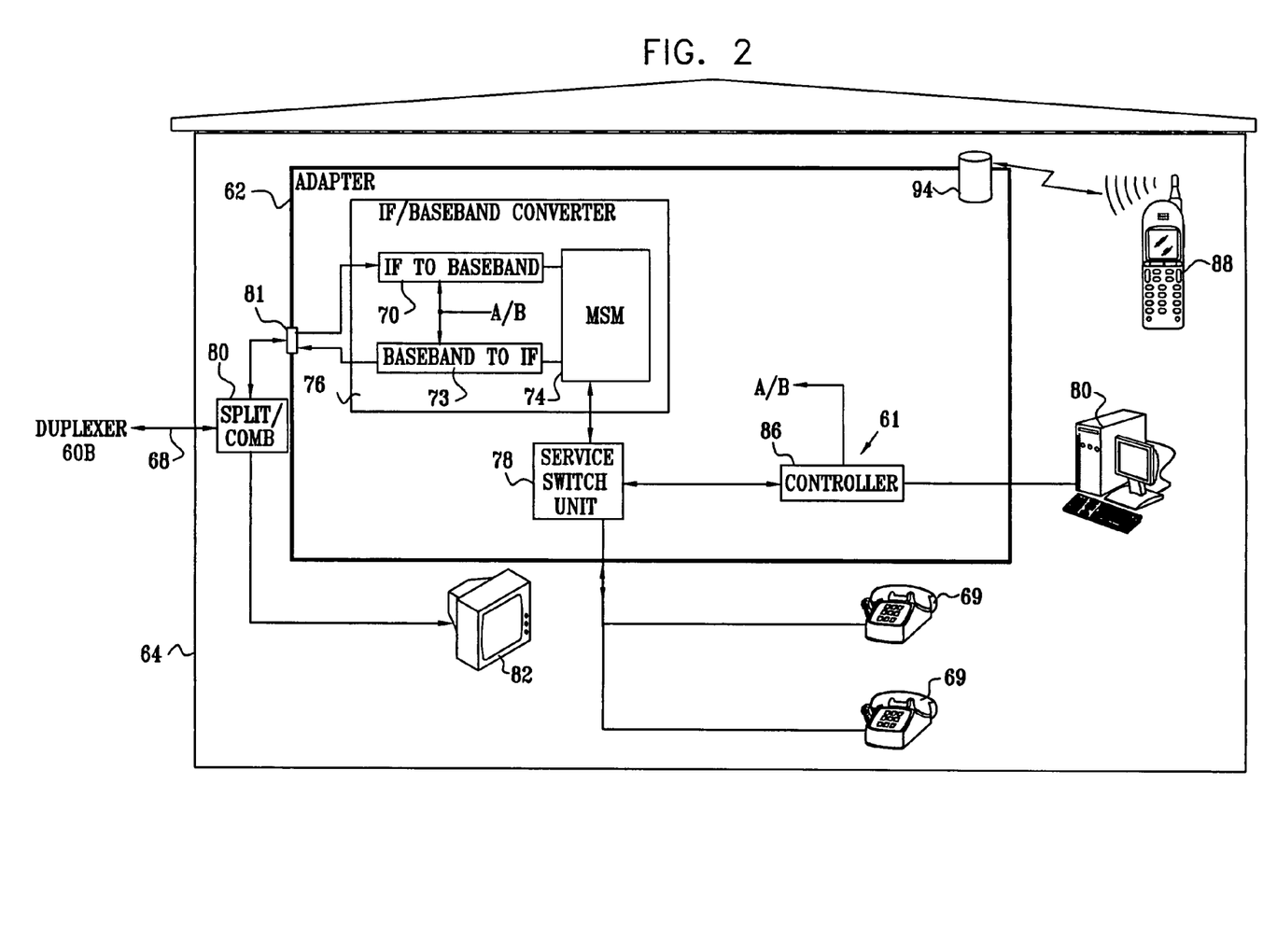
FIG. 2 is a schematic diagram illustrating use of a telephone adapter in the system of FIG. 1, according to a preferred embodiment of the present invention.

FIG. 2 is a schematic diagram illustrating elements of adapter 62 in home 64, according to a preferred embodiment of the present invention. Except as described below, adapters 62 and 72 are generally similar in operation and construction. As is described in more detail below, each adapter acts as a cellular signal converter, so that downstream IF cellular signals received from network 56 are converted to downstream baseband signals, and so that upstream baseband signals are converted to upstream IF cellular signals. A splitter/combiner 80 coupled to wire 68 separates CATV broadcast, CMTS, and INA signals received from network 56, and conveys the signals to a television 82 in home 64. Splitter/combiner 80 also conveys IF cellular signals to and from adapter 62 via a CATV network interface 81.

Adapter 62 comprises IF-baseband converter circuitry 76. Circuitry 76 comprises an IF to baseband converter 70 which is able to convert the downstream IF cellular signals received from CATV network interface 81 directly to downstream baseband signals. Circuitry 76 also comprises a baseband to IF converter 73 which converts upstream baseband signals to upstream IF cellular signals. Converters 70 and 73 are coupled to a mobile site modem (MSM) 74 which in turn is coupled to a service switch unit 78. Converters 70 and 73, and modem 74, are known in the art. Power levels of upstream IF cellular signals from adapters 62 and 72 are most preferably adjusted to avoid crossing an upstream threshold limit of CATV network 56, as is explained in more detail below.

Service switch unit 78 acts as a PSTN interface between one or more PSTN telephones 69 and converter circuitry 76. Such interfaces are well known in the telephone art. Thus, unit 78 comprises a line detector, a ring detector, an on/off hook detector, a flash detector, and a dual tone multi frequency (DTMF) detector. Unit 78 further comprises a flash generator, a ring generator, and an on/off hook circuit. Unit 78 is configured to communicate with a controller 86 comprised in adapter 62, the controller acting as an overall controller for the adapter. Optionally, controller 86 is coupled to a computer 80 in home 64, so that an occupant of the home may operate adapter 62, although typically the adapter operates automatically under the control of controller 86. Circuitry 76 and unit 78 are coupled together so that telephones 69 are able to place and receive cellular calls to and from network 40; the circuitry and unit combination convert IF cellular down-link signals to down-link baseband, and convert up-link baseband to IF cellular up-link signals. Thus, a call from network 40 to home 64 is routed to telephones 69, and a call from telephones 69 is routed to network 40, so that from the point of view of a user of telephones 69, the telephones are wired substantially directly to network 40.

Adapter 62 comprises a control 61, most preferably a software control incorporated in controller 86, which is preferably set by an operator of system 20 when adapter 62 is installed in home 64. Alternatively or additionally, control 61 may be operated by control signals from system controller 58, typically using a down-link messaging link. Control 61 may be set to one of two states. In a first "A" state, circuitry 76 receives and transmits $IF_1$, and rejects $IF_2$. In a second "B" state, circuitry 76 receives and transmits $IF_2$, and rejects $IF_1$. Control 61 is set to the first A state in all adapters 62 in facilities 63 in group 63I (FIG. 1), to form a group operating on $IF_1$. Control 61 is set to the second B state in all adapters 72 in facilities 63 in group 63II, to form a group operating on $IF_2$.

In some preferred embodiments of the present invention, adapter 62 itself operates as a "stand-alone" wired cellular telephone. In this case, adapter 62 comprises a keypad and a loudspeaker/microphone handset, similar to those of telephone 69. Alternatively or additionally, a cordless handset 88 may be coupled to adapter 62, communicating with the adapter via an antenna 94, using a protocol known in the art for cordless telephones, so that the adapter operates as a cordless telephone. Similarly, adapter 72 may be configured as a stand-alone and/or as a cordless telephone.

Returning to FIG. 1, upstream IF signals from adapters 62 and 72 are transmitted upstream along one of four paths. In a first path, facilities 63 in group 63A transmit upstream to RPR 65A, which splits off CATV up-link signals from group 63A, and conveys the CATV up-link signals to network 56. In three corresponding paths, RPRs 65B, 65C, and 65D also split off CATV up-link signals from respective groups 63B, 63C, and 63D. The upstream $IF_1$ signals from groups 63A and 63B are transferred to BTSC 44, which converts the $IF_1$ signals to RF signals. The converted signals from groups 63A and 63B are then conveyed respectively to main port 21 and diversity port 23 of sector 28. The upstream $IF_2$ signals from groups 63C and 63D are transferred to BTSC 46, which converts the $IF_2$ signals to RF signals. The converted signals from groups 63C and 63D are then conveyed respectively to main port 31 and diversity port 29 of sector 36. Thus, each group 63A, 63B, 63C, and 63D transmits up-link cellular signals to a specific main or a specific diversity port.

It will be understood that configuring each BTS sector main and diversity port to receive signals from different transmitters increases the up-link capacity of the BTS sector, compared to sectors where the main and diversity ports receive transmissions from the same transmitters. It will be appreciated that where the BTS sectors are operative in a CDMA network, the increase in capacity is of the order of 100%, and there is a similar increase in capacity for other cellular networks such as those operating on a TDMA protocol. Additionally, multiplexing two sectors in the downstream direction, using two different frequencies, $IF_1$ and $IF_2$, supports approximately four times the capacity of a single sector having a single transmit path and combined main and diversity receive paths.

Figure 3:
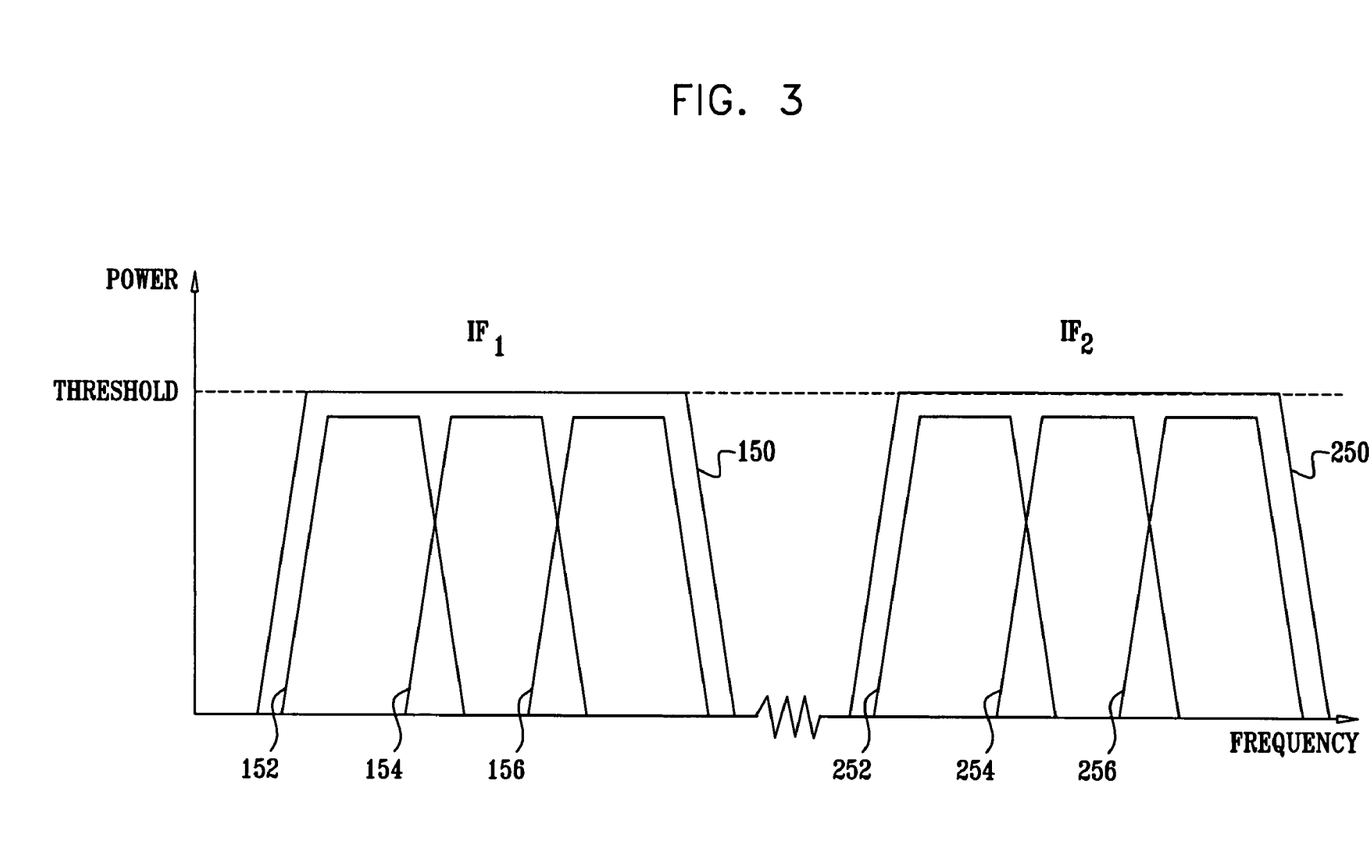
FIG. 3 is a schematic graph showing intermediate frequencies used in the system of FIG. 1, according to a preferred embodiment of the present invention.

FIG. 3 is a schematic graph showing intermediate frequencies $IF_1$ and $IF_2$ used in system 20, according to a preferred embodiment of the present invention. As stated above, levels of IF up-link signals from adapters 62 and 72 should be at or below a predetermined threshold level, typically up to 20–25 dB above a noise floor, to avoid blocking signals of CATV network 56. Adapters 62 and 72 may thus transmit broadband up-link IF signals 150 ($IF_1$) and 250 ($IF_2$) which have a maximum level at the threshold allowed by network 56. Alternatively, adapters 62 and/or 72 may be configured to transmit in one of a selection of narrower bands, for example three bands 152, 154, 156, for $IF_1$ and three bands 252, 254, and 256 for $IF_2$, each narrower band having a maximum level below the threshold level, typically 5 dB below the level. The center frequency of the narrow band in which a specific adapter transmits is most preferably dynamically selected by a signal from system controller 58 and/or from BSTC 44 or 46 to the adapter. Alternatively or additionally, the center frequency at which a specific adapter transmits may be chosen by the controller 86 of the adapter, most preferably according to frequencies made available by a CATV operator.

Depending on the protocol by which cellular network 40 operates, adapters 62 may be configured to transmit within the same or different narrow bands 152, 154, or 156;

similarly adapters 72 may be configured to transmit within the same or different narrow bands 252, 254, or 256. By configuring the adapters to transmit up-link signals in a number of narrow IF bands, the trunking efficiency of system 20 and adapters 62 and 72 may be further increased, and immunity to interference may be improved.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A base-station transceiver system (BTS) operative in a cellular telephone network, comprising:
   a main up-link port and a diversity up-link port adapted to operate cooperatively to receive up-link signals over-the-air from cellular telephones such that both of the ports receive the up-link signals from each of the cellular telephones, the main up-link port and the diversity up-link port being coupled to receive signals from wired telephones, such that the main up-link port receives signals only from a first group of the wired telephones and the diversity up-link port receives signals only from a second group of the wired telephones, the wired telephones being connected by wire to a cable television (CATV) network wherein the signals from the first and the second group of wired telephones are conveyed to the main up-link port and the diversity up-link port via the CATV network;
   signal processing circuitry adapted to receive the signals from the up-link ports and convey the signals over the network;
   a first duplexer adapted to receive the signals from the first group of wired telephones and to convey the signals to the main up-link port;
   a second duplexer adapted to receive the signals from the second group of wired telephones and to convey the signals to the diversity up-link port; and
   a down-link port adapted to convey down-link signals via the first duplexer and the CATV network to the first group of wired telephones and via the second duplexer and the CATV network to the second group of wired telephones.

2. The BTS according to claim 1, wherein at least one of the wired telephones comprises a baseband-telephone which receives and transmits baseband signals, and a telephone adapter which is connected to the baseband-telephone and which is adapted to convert between the baseband signals and the signals received by the main up-link port and the diversity up-link port.

3. A base-station transceiver system (BTS) operative in a cellular telephone network, comprising:
   a main up-link port and a diversity up-link port adapted to operate cooperatively to receive up-link signals over-the-air from cellular telephones such that both of the parts receive the up-link signals from each of the cellular telephones, the main up-link port and the diversity up-link port being coupled to receive signals from wired telephones such that the main up-link port receives signals only from a first group of the wired telephones and the diversity up-link port receives signals only from a second group of the wired telephones, the wired telephones being connected by wire to a cable television (CATV) network wherein the signals from the first and the second group of wired telephones are conveyed to the main up-link port and the diversity up-link port via the CATV network;
   signal processing circuitry adapted to receive the signals from the up-link ports and convey the signals over the network;
   a first down-link port adapted to transmit first down-link signals to the cellular telephones;
   a further main up-link port and a further diversity up-link port adapted to operate cooperatively to receive up-link signals over-the-air from cellular telephones such that both of the ports receive the up-link signals from each of the cellular telephones, the further main up-link port and further diversity up-link port being coupled to receive signals from the wired telephones such that the further main up-link port receives signals only from a third group of the wired telephones and the further diversity up-link port receives signals only from a fourth group of the wired telephones;
   a second down-link port which is adapted to transmit second down-link signals to the cellular telephones; and
   a four-way splitter which is adapted to receive the first and the second down-link signals and is coupled to distribute the first and the second down-link signals to the first, second, third, and fourth group of the wired telephones.

4. The BTS according to claim 3, wherein the four-way splitter comprises an existing four-way splitter operative in the CATV network to convey CATV signals to a first, a second, a third, and a fourth group of CATV receiver locations, and wherein locations of the first, second, third, and fourth group of the wired telephones respectively correspond to the first, second, third, and fourth group of CATV receiver locations.

5. The BTS according to claim 4, and comprising first, second, third, and fourth return path receivers (RPRs) which are respectively coupled to the first, second, third, and fourth group of the wired telephones so as to convey cellular up-link signals therefrom respectively to the main up-link port, the diversity up-link port, the further main up-link port, and the further diversity up-link port.

6. The BTS according to claim 5, wherein the RPRs are adapted to convey up-link CATV signals to the CATV network.

7. A base-station transceiver system (BTS) operative in a cellular telephone network, comprising:
   a main up-link port and a diversity up-link port adapted to operate cooperatively to receive up-link radio frequency (RF) signals over-the-air from cellular telephones such that both of the ports receive the up-link signals from each of the cellular telephones, the main up-link port and the diversity up-link port being coupled to receive radio frequency (RF) signals from wired telephones such that the main up-link port receives signals only from a first group of the wired telephones and the diversity up-link port receives signals only from a second group of the wired telephones; and
   signal processing circuitry which is adapted to receive the signals from the up-link ports and convey the signals over the network, said BTS comprising a BTS converter (BTSC) which is adapted to convert intermediate frequency (IF) signals received from the wired telephones to the RF signals;

wherein the IF signals are transmitted within an overall IF bandwidth, and wherein the first group of telephones comprises a first telephone which transmits within a first IF bandwidth narrower than the overall IF bandwidth and a second telephone which transmits within a second IF bandwidth narrower than the overall IF bandwidth.

8. The BTS according to claim 7, wherein the first IF bandwidth is approximately the same as the second IF bandwidth.

9. The BTS according to claim 7, wherein the first IF bandwidth and the second IF bandwidth comprise different frequencies.

10. A method for conveying signals in a cellular telephone network, comprising:
  coupling a main up-link port and a diversity up-link port of a base-station transceiver system (BTS) to receive up-link signals from wired telephones so that the main up-link port receives signals only from a first group of the wired telephones operative in a cellular telephone network and the diversity up-link port receives signals only from a second group of the wired telephones operative in the cellular telephone network, the main up-link port and the diversity up-link port being adapted to operate cooperatively to receive up-link signals over-the-air from cellular telephones such that both of the ports receive the up-link signals from each of the cellular telephones;
  receiving the signals from the up-link ports and conveying the signals to the network, the wired telephones being connected by wire to a cable television (CATV) network, the signals from the first and the second group of wired telephones being conveyed to the main up-link port and the diversity up-link port via the CATV network;
  receiving the signals from the first group of wired telephones in a first duplexer and conveying the signals to the main up-link port;
  receiving the signals from the second group of wired telephones in a second duplexer and conveying the signals to the diversity up-link port; and
  conveying down-link signals via the first duplexer and the CATV network to the first group of wired telephones and via the second duplexer and the CATV network to the second group of wired telephones.

11. A method for conveying signals in a cellular telephone network, comprising:
  coupling a main up-link port and a diversity up-link port of a base-station transceiver system (BTS) to receive up-link signals from wired telephones so that the main up-link port receives signals only from a first group of the wired telephones operative in a cellular telephone network and the diversity up-link port receives signals only from a second group of the wired telephones operative in the cellular telephone network, the main up-link port and the diversity up-link port being adapted to operate cooperatively to receive up-link signals over-the-air from cellular telephones such that both of the ports receive the up-link signals from each of the cellular telephones;
  receiving the signals from the up-link ports and conveying the signals to the network, the wired telephones being connected by wire to a cable television (CATV) network, the signals from the first and the second group of wired telephones being conveyed to the main up-link port and the diversity up-link port via the CATV network;
  transmitting first down-link signals from a down-link port to the cellular telephones;
  coupling a further main up-link port and a further diversity up-link port of the BTS to receive up-link signals from wired telephones so that the further main up-link port receives signals only from a third group of the wired telephones operative in the cellular telephone network and the diversity up-link port receives signals only from a fourth group of the wired telephones operative in the cellular telephone network, the further main up-link port and the further diversity up-link port being adapted to operate cooperatively to receive up-link signals over-the-air from cellular telephones such that both of the ports receive the up-link signals from each of the cellular telephones; and
  receiving the first and the second down-link signals in a four-way splitter which is coupled to distribute the first and the second down-link signals to the first, second, third, and fourth group of the wired telephones.

12. The method according to claim 11, wherein the four-way splitter comprises an existing four-way splitter operative in the CATV network to convey CATV signals to a first, a second, a third, and a fourth group of CATV receiver locations, and wherein locations of the first, second, third, and fourth group of the wired telephones respectively correspond to the first, second, third, and fourth group of CATV receiver locations.

13. The method according to claim 12, and comprising coupling first, second, third, and fourth return path receivers (RPRs) respectively to the first, second, third, and fourth group of the wired telephones so as to convey cellular up-link signals therefrom respectively to the main up-lint port, the diversity up-link port, the further main up-link port, and the further diversity up-link port.

14. The method according to claim 13, wherein the RPRs are adapted to convey up-link CATV signals to the CATV network.

15. A method for conveying signals in a cellular telephone network, comprising:
  coupling a main up-link port and a diversity up-link port of a base-station transceiver system (BTS) to receive up-link radio frequency (RF) signals from wired telephones so that the main up-link port receives radio frequency (Rf) signals only from a first group of the wired telephones operative in a cellular telephone network and the diversity up-link port receives radio frequency (RF) signals only from a second group of the wired telephones operative in the cellular telephone network, the main up-link port and the diversity up-link port being adapted to operate cooperatively to receive radio frequency (RF) up-link signals over-the-air from cellular telephones such that both of the ports receive the up-link signals from each of the cellular telephones; and
  receiving the signals from the up-link ports and conveying the signals to the network;
  converting intermediate frequency (If) signals received from the wired telephones to the RF signals
  the IF signals being transmitted within an overall IF bandwidth, and wherein the first group of telephones comprises a first telephone which transmits within a first IF bandwidth narrower than the overall IF bandwidth and a second telephone which transmits within a second IF bandwidth narrower than the overall IF bandwidths, wherein the IF signals are transmitted via a CATV network, and wherein a level of the IF signals is less than or equal to a threshold level of signals in the CATV network.

16. The method according to claim 15, wherein the first IF bandwidth is approximately the same as the second IF bandwidth.

17. The method according to claim 15, wherein the first IF bandwidth and the second IF bandwidth comprise different frequencies.

* * * * *